Figure 1:
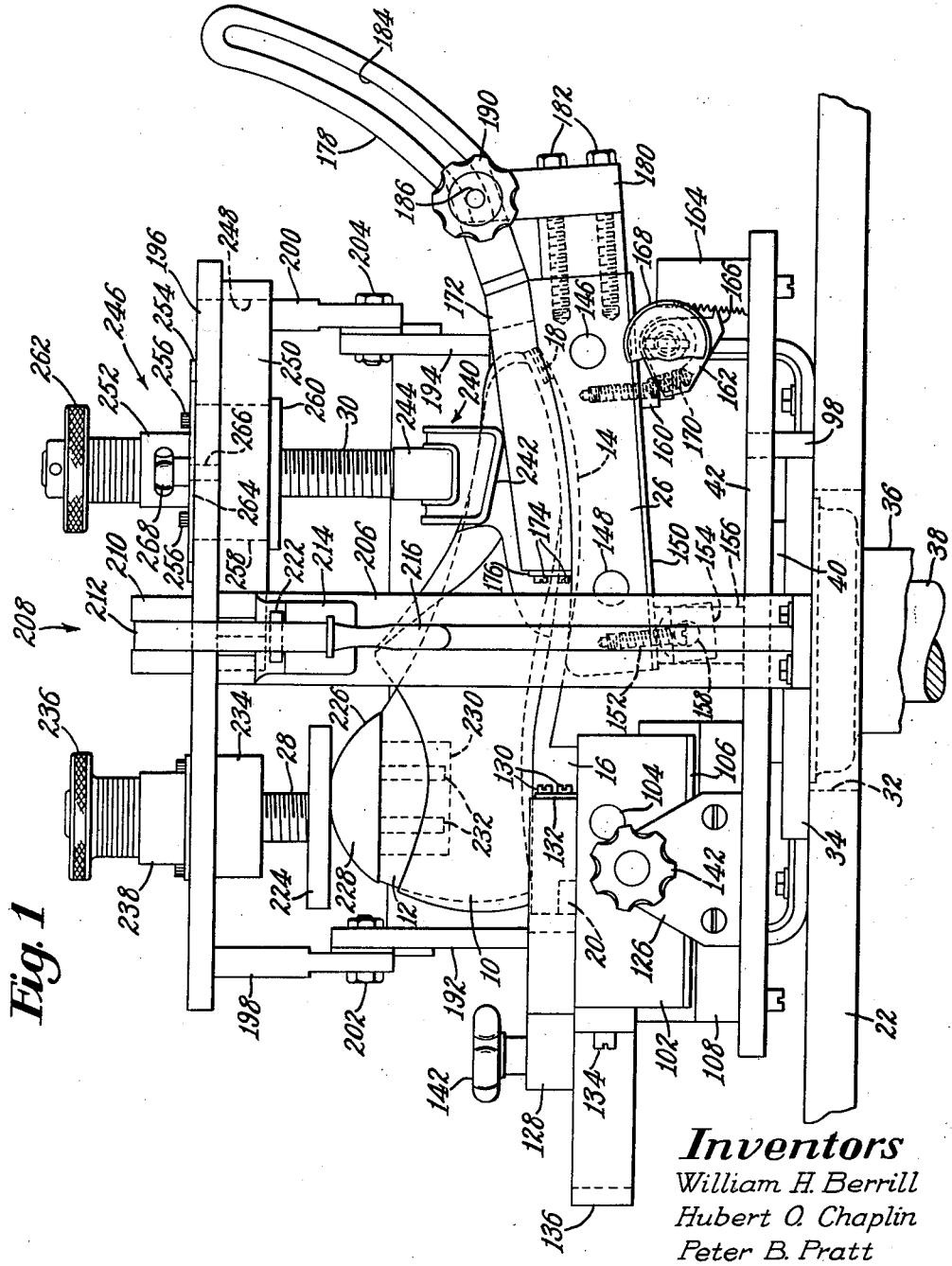

May 11, 1965  W. H. BERRILL ETAL  3,182,354

MOLDING MACHINES FOR REPAIRING SHOE SOLE AND HEEL UNITS

Filed April 26, 1963  4 Sheets-Sheet 1

*Inventors*
William H. Berrill
Hubert O. Chaplin
Peter B. Pratt
By their Attorney

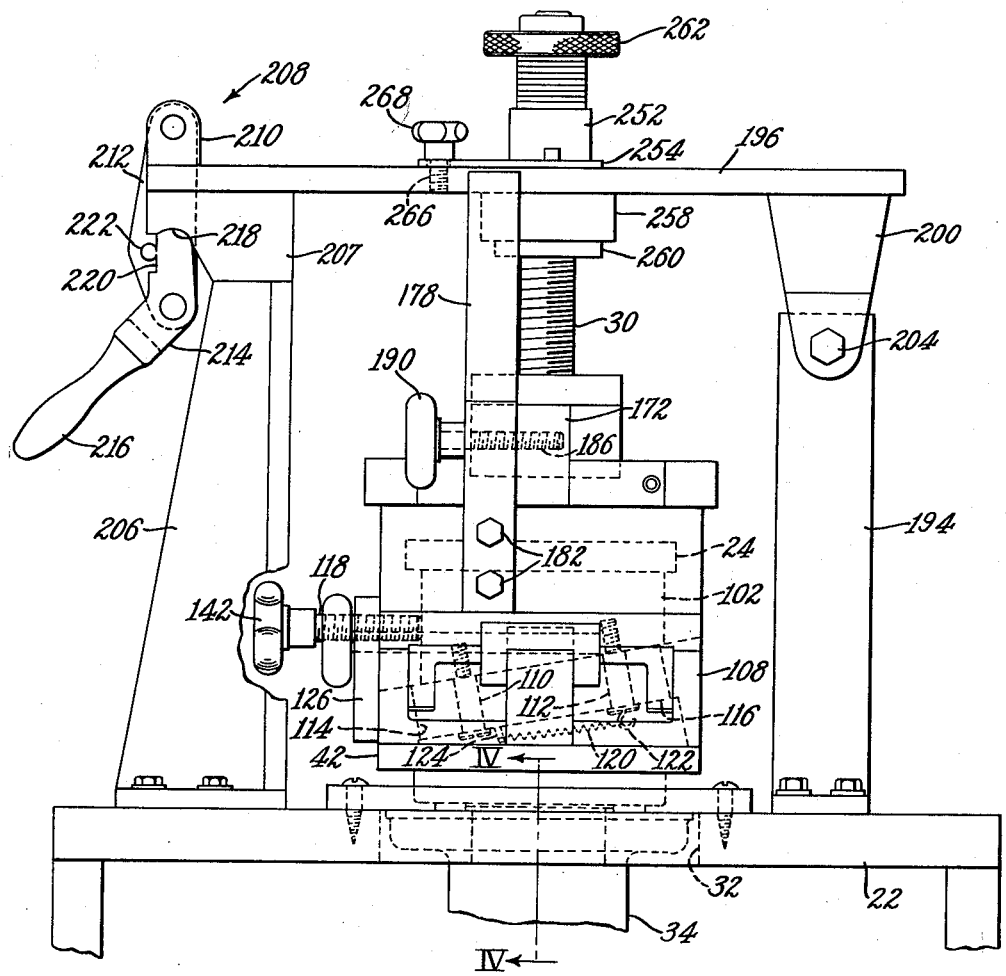

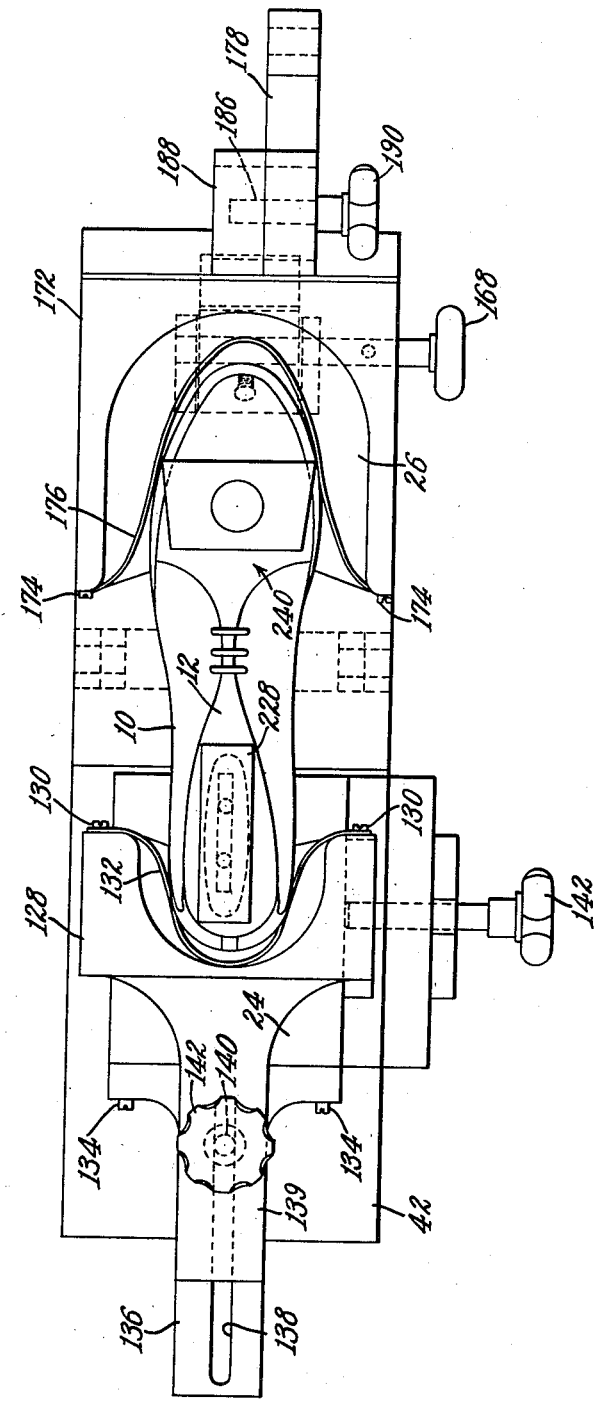

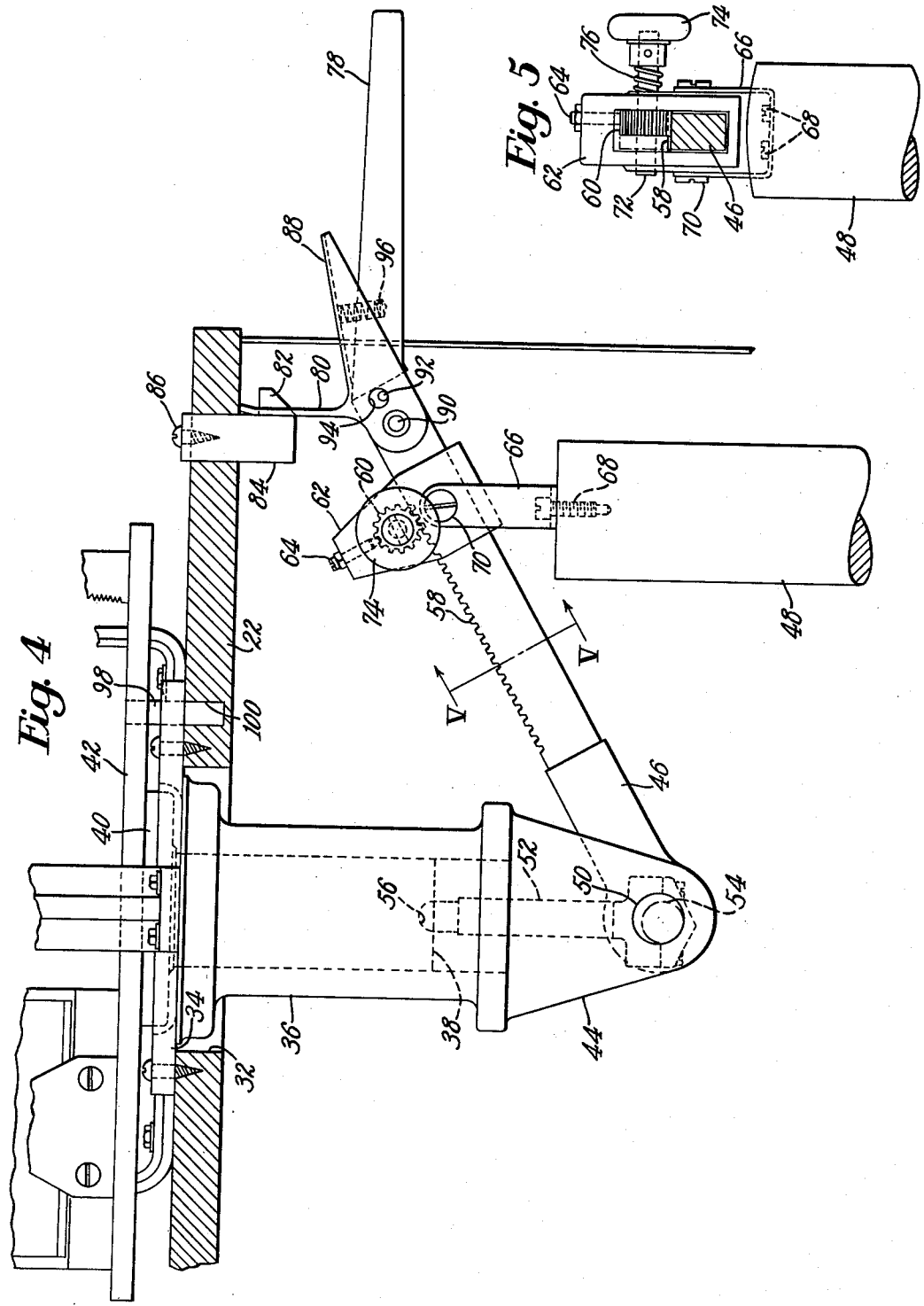

United States Patent Office
3,182,354
Patented May 11, 1965

3,182,354
MOLDING MACHINES FOR REPAIRING SHOE SOLE AND HEEL UNITS
William H. Berrill, Hubert O. Chaplin, and Peter B. Pratt, Leicester, England, assignors to United Shoe Machinery Corporation, Boston, Mass., a corporation of New Jersey
Filed Apr. 26, 1963, Ser. No. 275,945
Claims priority, application Great Britain, May 3, 1962, 16,947/62
4 Claims. (Cl. 18—17)

This invention relates to shoe machines, and is herein illustrated in its application to machines for repairing soles, particularly soles molded in situ onto shoe bottoms.

The efficient repairing of soles molded in situ onto shoe bottoms requires machinery or apparatus of a type not commonly found in shoe repair shops. A machine or apparatus for this type of shoe repairing is disclosed, for example, in United States Letters Patent No. 2,406,359, granted August 27, 1946, on an application filed in the name of William H. Doherty.

It is an object of the present invention to provide an improved machine of the type above described and particularly a machine which is readily and conveniently adjustable for operation on shoes of different sizes and styles.

With the above and other objects in view, as will hereinafter appear, the present invention, in one aspect thereof, contemplates the provision in a shoe repairing machine having a heel tread mold member, a forepart tread mold member and an elevator or platen on which the mold members are mounted, of means whereby the heel tread mold member is adjustable heightwise of a shoe in the machine relatively to the elevator and relatively to the forepart tread mold member, and the forepart mold member is angularly adjustable heightwise of the shoe in order to accommodate it to different shoe bottom contours. In accordance with a further feature of the invention, the holddown means comprises a forepart holddown member and a heel holddown member mounted on a platen hinged at one side of a shoe in the machine for swinging movement heightwise of the shoe and provided at the opposite side of the shoe with means for clamping the platen against swinging movement. The heel holddown member is mounted on the platen itself and the forepart holddown member is mounted on a carrier which in turn is slidably mounted on the platen for adjustive movement lengthwise of the shoe.

In accordance with a further feature of the invention, a shoe repairing machine having adjustable tread mold members as above described is provided with a flexible mold band constructed and arranged to engage the edge of the sole at one end of the shoe to complete the mold assembly, a band carrier whereby the band is advanced into sole engaging position and means for securing the carrier in adjusted position relatively to the shoe.

The invention will now be described with reference to the accompanying drawings and pointed out in the appended claims.

In the drawings:
FIG. 1 is a side elevation illustrating a machine embodying the features of the present invention;
FIG. 2 is a rear elevation of the machine illustrated in FIG. 1;
FIG. 3 is a plan view of a mold assembly incorporated in the machine;
FIG. 4 is a side elevation partly in section on the line IV—IV of FIG. 2 illustrating certain operating instrumentalities of the machine; and
FIG. 5 is a section taken on the line V—V of FIG. 4.

The invention is illustrated in the drawings as embodied in a machine for repairing soles and heels of shoes, particularly shoes having vulcanized rubber sole and heel units. The machine is provided with two mold assemblies, one for a left shoe and one for a right shoe, for molding and vulcanizing rubber onto worn portions of sole and heel units. Illustrated in the drawings is a mold assembly for repairing left shoes. The construction and operation of the mold assembly for right shoes is substantially similar to the assembly illustrated in the drawings and will be understood from the following description.

Referring to FIG. 1 a left shoe 10 mounted on a shoe form 12 is arranged upright in the machine for the performance of a sole repairing operation thereon. The illustrated shoe has vulcanized thereon a rubber sole 14 and a rubber heel 16. A worn toe end portion of the sole 14 is identified by the numeral 18 and a worn back part of the heel is identified by the numeral 20. The two mold assemblies are arranged side by side above a table 22. The illustrated mold assembly comprises a tread mold member 24 (FIG. 2) constructed and arranged to receive the heel 16 of the illustrated shoe and a tread mold member 26 which receives the sole 14. For clamping the shoe and the shoe form mounted therein against the tread mold members, the illustrated machine is provided with holddown members 28 and 30, the former being arranged to act on the heel end portion of the shoe form 12 and the latter being arranged to engage the toe portion of the shoe 10. Suitable charges of unvulcanized rubber are provided for filling the worn portion 18 and 20 of the sole and the heel, respectively. The tread mold members 24 and 26 are heated and upward pressure is applied thereto in order to press charges of unvulcanized rubber against the sole and the heel respectively.

A relatively large circular opening 32 is formed in the table 22 and secured to the top of the table in concentric relation to the opening is an annular plate 34. Referring to FIG. 4, a cylindrical barrel 36 is secured to the plate 34 and extends downwardly therefrom through the opening 32. A thrust member or piston 38 is slidably mounted in the barrel 36 and its upper portion projects above the barrel and is provided with a head 40. Secured to the head 40 is a platen or elevator 42 on which the mold assemblies are carried. Extending downwardly from the outwardly flanged lower end portion of the barrel 36 are arms 44 and positioned between the arms is a lever 46 which carries a weight 48 whereby substantial upward pressure is exerted against the platen 42 and the mold assemblies carried thereby. The left end portion of the lever 46 has fixed therein a cross pin 50 opposite end portions of which are journaled in suitable bearings in the arms 44. The left end portion of the lever 46 is bifurcated to receive the lower end portion of a thrust pin 52 which is journaled on an eccentric central portion 54 of the cross pin having its axis offset downwardly and to the left from the axis of the end portions of the cross pin. The upper end portion of the thrust pin 52 is rounded for engagement in a complementally shaped recess 56 formed in the lower end portion of a piston 38. The weight 48 exerts a downward force on the lever 46 and the lever exerts a greatly magnified upward force against the thrust pin 52. The upward force of the thrust pin is transmitted through the piston 38 and the platen or elevator 42 to the mold assembly. The upward pressure exerted against the thrust pin 52 may be varied by adjusting the position of the weight 48 on the lever 46. To this end the lever has formed therein rack teeth 58 which mesh with a pinion 60 mounted in a weight carrier herein illustrated as a hollow, rectangular member 62 (FIG. 5) constructed and arranged to embrace the lever 46. For locking the member 62 against movement longitudinally of the lever 46 a pin 64 is mounted in the upper portion of the member 62 and arranged for interdental engagement with the pinion 60. To provide for the mounting of the weight on the member 62 a yoke 66 is secured to the weight by headed screws 68, said yoke being constructed and arranged to embrace the member 62 and being provided at its upper extremity with headed screws 70 for pivotally attaching the weight to the member 62. As shown in FIG. 5 the pinion 60 is fixed to a cross shaft 72 mounted for endwise and rotary movement in suitable bearings in the member 62. A suitable knob 74 is secured to the right end portion of the shaft 72 and a spring 76 is mounted on the shaft 72 in the space between the hub of the knob 74 and the right wall of the member 62. The spring normally maintains the cross shaft 72 in its position shown in FIG. 5 in which the pinion 60 is arranged to engage the pin 64. When it is desired to adjust the weight 48 along the length of the lever 46 the knob 74 is moved to the left as seen in FIG. 5 against the pressure of the spring 76 to disengage the pinion from the locking pin 64. After the weight has been adjusted the pinion is permitted to be returned by the expansion of the spring 76 to locking engagement with the pin 64. For lifting the weight 48 into its retracted position illustrated in FIG. 4, the lever 46 is extended to provide a handle 78. For holding the weight in its retracted position a latch member 80 carried by the lever is arranged to engage a latch plate 82 projecting laterally from an angle plate 84 secured by a headed screw 86 to the table 22. The illustrated latch plate 82 is received within a vertical slot formed in the latch member 80. The illustrated latch member is formed integrally with a thumb lever 88 herein illustrated as an inverted channel structure pivotally mounted at 90 on the lever 46. The scope of angular movement of the thumb lever is determined by a pin 92 mounted in and extended laterally from the lever 46 through an aperture 94 in the thumb lever. A spring 96 mounted in a socket in the handle 78 bears against the thumb lever and normally holds it at the limit of its counterclockwise movement as seen in FIG. 4. When it is required to exert upward pressure on the platen 42 the operator disengages the latch 80 from the latch plate 82 and permits the weight 48 to move downwardly into pressure applying position.

For orienting the platen 42 and the mold assemblies mounted thereon relatively to the work clamping means a locating pin 98 is fixed to the platen 42 and arranged to extend downwardly therefrom into a bore 100 in the table 22.

The heel tread mold member 24 is supported upon the upper surface of a wedge shaped aluminum block 102 (FIG. 2) and the upper surface of the mold member has formed therein a matrix for molding the required configuration on the tread surface of the heel 16. The block is bored horizontally to receive a heating cartridge 104 (FIG. 1) which brings the block 102 and the mold member 24 to vulcanizing temperature. Secured to the bottom face of the block 102 is a plate 106 (FIG. 1) made of insulating material such as Tufnol. The block 102 and the insulating plate 106 are slidable as a unit upon a wedge shaped block 108 mounted on the platen 42. Relative movement of the blocks 102 and 108 serves to adjust the mold member 24 vertically relatively to the mold member 26. To provide for the slidable attachment of the block 108 to the block 102, two headed screws 110 and 112 are inserted through a slot 114 extending upwardly from a wedge shaped recess 116 to the upper surface of the block 108. The screws 110, 112 are fixed in the lower portion of the block 102 and serve to guide movement of the block 108 widthwise of a shoe in the machine. The block 102 is urged against the end of the stem of an adjusting screw 118 by a spring 120 one end of which is anchored to a hook 122 fixed in the head of the screw 112 and the other end of which is anchored to a pin 124 fixed in the block 108. The screw 118 has threaded engagement in a bracket 126 fixed to the block 108. Not shown in the drawings is a second slot parallel to the slot 114 and receiving headed screws similar to the screws 110 and 112 to provide further guidance for the movements of the block 102.

Cooperating with the heel tread mold member 24 is a peripheral mold member comprising a Y-shaped Tufnol block 128 (FIG. 3) having secured thereto by headed screws 130 a flexible steel band 132 which is bent into a generally U-shaped configuration. The block 128 is supported upon the mold member 24 for sliding movement toward and from the heel end of a shoe in the machine. Secured to the left edge face of the block 102 by headed screws 134 is a T-shaped extension 136 which is provided with a longitudinal slot 138 through which extends a clamping screw 140 rotatably mounted in a bore in an extension 139 of the block 128 and threaded through a nut (not shown which is restrained against rotation relatively to the screw. The screw is provided with a suitable knob 142 to facilitate manipulation thereof. The position of the mold assembly relatively to the heel tread mold member 24 is adjustable by turning the knob 142 to release the screw and manually sliding the assembly longitudinally of the slot 138. During such longitudinal adjustment the assembly is adjusted angularly as required to cause the band 132 to register properly with the heel of a shoe in the machine. Upon the completion of such adjustive movements the screw 140 is tightened to secure the band in its adjusted position.

The forepart tread mold member 26 (FIG. 1) comprises an aluminum block having formed in its upper surface a matrix constructed and arranged to form the forepart of the sole of a shoe to be repaired. Mounted in the block 26 are heating cartridges 146 and 148 which bring the block to vulcanizing temperature. Secured to the lower face of the block is a heat insulating plate 150 made of Tufnol or the like. To provide for angular adjustment of the block heightwise of a shoe in the machine there is secured to the rear portion of the block by screws 152 a yoke 154 extending downwardly into embracing relation to a boss 156 extending upwardly from platen or elevator 42 and connected thereto by suitable pivot pins 158. A bracket 160 secured to and depending from the forward portion of the block has pivotally mounted thereon a ratchet member 162 constructed and arranged to engage a ratchet plate 164 fixed to the platen 42. The ratchet member 162 is provided with a tooth 166 which has interdental engagement with the ratchet plate 164. When it is desired to adjust the angular disposition of the block 26 the ratchet tooth 166 is disengaged from the ratchet plate 164 by clockwise rotation of a knob 168 fixed to the ratchet member. After the adjustment has been effected the ratchet member 162 is returned to its operating position illustrated in FIG. 1 by the expansion of a spring 170 confined between a socket in the ratchet member and a similar socket formed in the bracket 160.

The forepart tread mold member 26 has cooperating therewith a peripheral mold member (FIG. 3) herein illustrated as a Y-shaped Tufnol block 172 having secured thereto by headed screws 174 a flexible steel band 176 bent to the general configuration of the forepart of a shoe. The peripheral mold assembly is slidably mounted upon the forepart tread mold member 26. For securing the peripheral mold assembly in adjusted position, the stem 188 of the Y-shaped block 172 carries a clamping screw 186 which extends through a longitudinal slot formed in an arcuate extension 178 (FIG. 1) of a bracket 180 attached to the mold member 26 by headed screws 182. A knob 190 is provided on the screw to facilitate the clamping of the peripheral mold assembly in its adjusted position.

To provide for the mounting and the operation of the holddown members 28 and 30 a U-shaped member providing two standards 192 and 194 (FIG. 1) is secured to the table 22 in back of the shoe, as seen in FIG. 1. Hinged for vertical swinging movement on the standards is a holddown carrier comprising a platen 196 having legs 198 and 200 depending therefrom and pivotally mounted on bolts 202 and 204 mounted in the standards. An angle iron post 206 is secured to the table 22 in front of the supported shoe, as seen in FIG. 1, and when the holddown members are in shoe engaging position the platen 196 is connected to the post 206 by a toggle clamp generally indicated by the numeral 208. Referring to FIG. 2, the toggle clamp comprises a link 212 pivoted between two arms 210 upstanding on the platen 196 and separated by an open ended slot formed in the platen. At its lower end the link 212 has pivoted thereon a bifurcated clamping member 214 which is provided with a handle 216. At its upper end the post 206 has an overhanging head 207, the overhanging portion of which is bifurcated to receive the link 212. The bifurcated portion of the head has formed therein two arcuate recesses 218 shaped complementally to rounded end portions 220 of the bifurcated clamping member 214. In the clamping of the platen 196 in its position illustrated in FIG. 2 the platen is swung downwardly onto the head of the post 206 and the handle 216 is swung downwardly to bring the clamping member 214 into the recess 218 thus extending the toggle into a position determined by the engagement of the member 214 within a stop pin 222 mounted in the link 212 thereby clamping the platen 196 against the head 207 of the post. Preparatory to the removal of a repaired shoe from the mold assembly the handle 216 is swung upwardly from its position illustrated in FIG. 2 thus breaking the toggle and permitting upward swinging movement of the platen 196 into its retracted position.

The holddown member 28 as shown in FIG. 1 is provided with a clamping plate 224 which engages a convex surface 226 of the head of a cap 228 which is loosely mounted in a groove 230 formed in the shoe form 12, the clamp being provided with two stems 232 which are freely received within the groove 230. The stem of the holddown member 28 is screw threaded and is received in a tapped hole in a cylindrical fixture 234 extending downwardly from the platen 196 which is bored to receive the clamping member. A knob 236 is secured to the upper end portion of the holddown member to facilitate vertical adjustment of the plate 224. The hub of the knob has graduations inscribed thereon providing convenient means for indicating the vertical position of the holddown member. The graduations are read with relation to the upper surface of a tubular fixture 238 secured to the upper surface of the platen 196 and arranged to receive the hub of the knob 236. The toe holddown member 30 is provided with an upper engaging foot 240 the bottom face of which is shaped generally complementally to the forepart of the upper of the shoe 10. The illustrated foot is fabricated from hard felt and backed by a molded sheet 242 made of polyvinyl chloride or the like. The backing sheet is secured to a tubular stem 244 which has swiveled therein the lower end portion of the stem of the holddown member 30. The stem of the holddown member has threaded engagement in a tapped bore in a carrier 246 mounted for horizontal sliding movement in a slot 248 formed in the platen 196 and extending from the platen downwardly through a plate 250 secured to the bottom surface of the platen. The illustrated carrier comprises a tubular head 252 having at its base a wide flange 254 which is slidably supported upon the upper surface of the platen 196. Secured to the flange 254 by headed screws 256 and depending therefrom is a rectangular base portion 258 constructed and arranged for horizontal sliding movement between the side walls of the slot 248. A flange 260 at the lower extremity of the base 258 slidably engages the bottom surface of the plate 250 and holds the carrier against upward movement. To facilitate vertical adjustment of the foot 240 a knob 262 is secured to the upper end portion of the stem of the holddown member 30 and the hub of the knob has inscribed thereon graduations which are readable with relation to the upper surface of the tubular head 252 of the carrier. To provide for the clamping of the carrier in its adjusted portion longitudinally of the slot 248 the flange 254 is provided with a slot 264 parallel to and offset forwardly from the slot 248 and a clamping screw 266 having a knob 268 extends through the slot 264 and into a tapped bore in the platen 196.

In the operation of the illustrated machine a shoe to be repaired such, for example, as the shoe 10 illustrated in FIG. 1, is mounted on a shoe form such, for example, as the shoe form 12, and placed in upright position upon the illustrated mold assembly whereupon the mold elements and the holddown members are adjusted to the contours of the shoe. The blocks 128 and 172 which carry the heel band 132 (FIG. 3) and the toe band 176 are then moved away from the shoe and the shoe is removed from the mold assembly. The heel holddown 28 and the toe holddown 30 are then adjusted two full turns downwardly to give them increased pressure against the shoe and the shoe form. The worn end portions 18 and 20 of the shoe are then scoured to a uniform depth and the remaining portions of the sole 14 and the heel 16 are roughed sufficiently to insure an adequate bond of sole attaching adhesive thereto. Adhesive is then applied to the worn end portions 18 and 20 of the sole and the heel, respectively, and unvulcanized rubber is applied to the worn portions to bring them up to the level of the adjacent parts of the sole and heel unit. A thin layer of unvulcanized rubber is then applied to the entire sole portion including the unvulcanized rubber inserted into the worn portion and another thin layer of unvulcanized rubber is applied to the heel portion and to the unvulcanized rubber inserted into the worn portion 20. The shoe is then repositioned on the mold assembly whereupon the bands 132 and 176 are brought into engagement with the edge faces of the sole and the heel respectively. The holddown members 28 and 30 are then clamped against the shoe form and the shoe by the operation of the toggle linkage 208 and upward pressure is applied to the tread mold members by the weight 48. The bands operate to minimize spew of fluid rubber at the peripheral portions of the sole and heel unit and the heat applied to the mold members causes vulcanization of the new rubber. Upon the completion of the vulcanizing cycle the bands and the clamping members are removed from the shoe and the shoe is lifted from the mold assembly. Any spew which may have occurred in the vulcanizing operation is then removed by scouring, thus completing the shoe repairing operation.

Under some circumstances it may be unnecessary to apply upward pressure to the tread mold members by means of the weight 48. In such cases the shoe repairing operation is affected as above described except that the weight 48 remains in its retracted or inoperative position shown in FIG. 4.

Having thus described our invention, what we claim as new and desire to secure by Letters Patent of the United States is:

1. In a shoe repairing machine, a heel tread mold member, a forepart tread mold member, an elevator on which the mold members are mounted, means for adjusting the heel tread mold member heightwise of a shoe in the machine relatively to the elevator and relatively to the forepart tread mold member, means mounting the forepart tread mold member for angular adjustment heightwise of the shoe, holddown means for clamping the shoe upon the mold members, and means for urging the elevator upwardly thereby to press the mold members against the shoe bottom.

2. In a shoe repairing machine according to claim 1, a flexible mold band constructed and arranged to engage the edge of the sole at one end of the shoe, a band carrier whereby the band is advanced into sole engaging position and means for securing the carrier in adjusted position relatively to the shoe.

3. In a shoe repairing machine, a heel tread mold member, a forepart tread mold member, an elevator on which the mold members are mounted, means for adjusting the heel tread mold member heightwise of a shoe in the machine relatively to the elevator, means mounting the forepart tread mold member for angular adjustive movement heightwise of the shoe, means for locking the forepart tread mold member in its adjusted angular position, and holddown means for clamping the shoe upon the mold members.

4. In a shoe repairing machine, a heel tread mold member, a forepart tread mold member, an elevator on which the mold members are mounted, a holddown platen, a heel holddown member mounted on the platen, a carrier mounted on the platen for adjustive movement lengthwise of a shoe in the machine, a forepart holddown member mounted on the carrier, means for adjusting the forepart holddown member heightwise of the shoe relatively to the carrier, means offset at one side of the shoe for hingeing the holddown platen for swinging movement heightwise of the shoe and means offset at the opposite side of the shoe for clamping the holddown platen against such swinging movement, and a piston operable to urge the elevator upwardly thereby to press the mold members against the bottom of the shoe.

References Cited by the Examiner
UNITED STATES PATENTS

| | | |
|---|---|---|
| 1,163,589 | 12/15 | Davenport. |
| 1,563,096 | 11/25 | MacDonald. |
| 2,178,086 | 10/39 | Szerenyi _____ 17—17 XR |
| 2,298,227 | 10/42 | Pinkerton et al. _____ 18—34 |
| 2,711,558 | 6/55 | Baker et al. _____ 18—34 XR |
| 3,012,279 | 12/61 | Szerszynski _____ 18—17 |
| 3,018,517 | 1/62 | Ludwig _____ 18—17 |
| 3,045,282 | 7/62 | Heideman _____ 18—17 |

FOREIGN PATENTS 225,969   12/59   Australia.

MICHAEL V. BRINDISI, *Primary Examiner.*
WILLIAM J. STEPHENSON, *Examiner.*